Sept. 18, 1956 K. W. PFLEGER 2,763,840

VARIABLE BANDWIDTH TRANSMISSION SYSTEM

Filed Dec. 18, 1952

INVENTOR
K. W. PFLEGER
BY [signature]
ATTORNEY

United States Patent Office 2,763,840
Patented Sept. 18, 1956

2,763,840

VARIABLE BANDWIDTH TRANSMISSION SYSTEM

Kenneth W. Pfleger, Arlington, N. J., assignor to Bell Telephone Laboratories, Incorporated, New York, N. Y., a corporation of New York Application December 18, 1952, Serial No. 326,753

10 Claims. (Cl. 333—17)

This invention relates to variable bandwidth transmission systems and more particularly to transmission systems in which the bandwidth is automatically adjusted in accordance with the frequency of the signal to be transmitted.

In many systems in which signals of variable frequency are transmitted, it has been found desirable to adjust the frequency characterisic of the system to eliminate all but the desired signal. Thus, either high-pass or low-pass filters may be included in the system to reject unwanted noise or signals of frequencies other than the band which it is desired to transmit. When such filters are employed in systems to which signals of variable frequency are applied, it has been necessary to provide broader pass bands than those necessary for the signal itself at any particular time. Accordingly much of the advantage to be obtained by the rejection of unwanted frequency components has been lost.

It is the object of the present invention to provide a transmission system for signals of varying frequency in which the band of frequencies accepted by the system varies in accordance with variations in the frequency of the desired signal.

In accordance with the invention, therefore, a transmission system is provided which includes a plurality of separate paths having different transmission characteristics. These are selectively placed in circuit between the input and output of the system by switches or gates which are correspondingly responsive to different amplitudes of a control signal. The necessary control signal is derived from the desired signal to be transmitted by a frequency sensitive element such as a discriminator.

Figure 1:
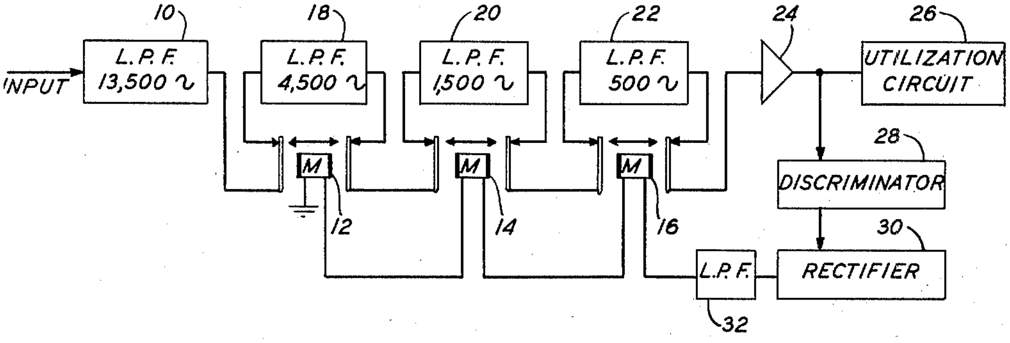
Figure 2:
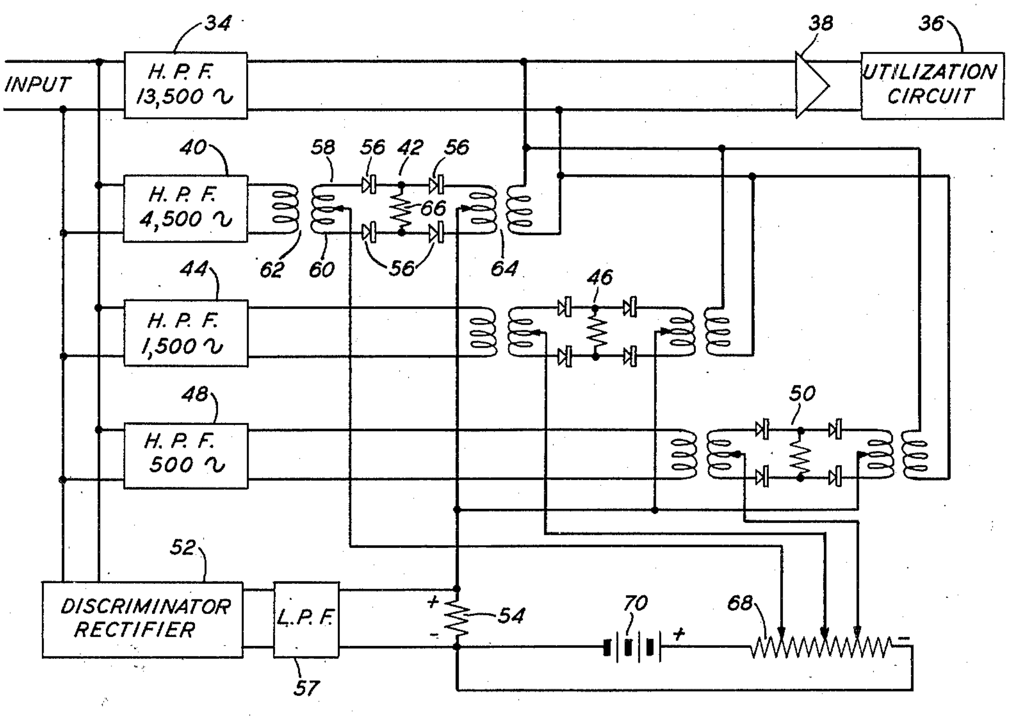

The above and other features of the invention will be described in detail in the following specification, taken in connection with the drawings in which:

Fig. 1 is a single line block schematic diagram of a transmission system according to the invention having an automatically adjustable low-pass characteristic; and Fig. 2 is a two-line block schematic diagram of another transmission system in accordance with the invention having automatically adjustable high-pass characteristic and employing alternative control circuits.

Figs. 1 and 2 of the drawing illustrate particular embodiments of the invention in transmission systems having low-pass and high-pass characteristics respectively. The same techniques may obviously be employed to provide transmission systems having band-pass characteristics. This may be accomplished in a variety of ways, perhaps the most obvious of which involves the connection of a high-pass and a low-pass system in tandem. Since this arrangement is well known in filter practice, the following description will be directed primarily to transmission systems according to the invention having either high-pass or low-pass characteristics.

In the transmission system illustrated in Fig. 1 provision is made for automatically adjusting the pass-band of a low-pass system in accordance with variations in the frequency of the signal wave to be transmitted. For convenience of description it is assumed that the signal to be transmitted may vary in frequency over the range extending from 13,500 cycles per second to less than 500 cycles per second, and means are provided for adjusting the cut-off frequency of a low-pass element in the system to reject all frequencies higher than those included in the signal to be transmitted at any particular time.

As shown in Fig. 1 a signal to be transmitted is applied to a low-pass filter 10 having a cut-off frequency of 13,500 cycles and thence through the normally closed contacts of relays 12, 14 and 16 in turn to a series of low-pass filters 18, 20 and 22 respectively having progressively lower cut-off frequencies. By way of example, filter 18 may have a cut-off frequency of 4,500 cycles per second, filter 25 a cut-off frequency of 1,500 cycles per second and filter 22 a cut-off frequency of 500 cycles per second. The output of filter 22 is connected through the normally closed contact of relay 16 to an amplifier 24 which is provided with automatic volume control and thence to a utilization circuit 26. Under these conditions, therefore, filters 10, 18, 20 and 22 are connected in tandem between the input of the transmission system and amplifier 24 and the transmission system has a low-pass characteristic with a cut-off at 500 cycles per second due to the presence of low-pass filter 22.

If the frequency of the signal which it is desired to transmit increases to a value greater than 500 cycles per second, it is desirable to adjust the pass-band of the system accordingly. For this purpose relays 12, 14 and 16 are arranged for selective operation and are provided with contact arrangements such that upon operation each relay serves to by-pass in the signal path the particular filters 18, 20 and 22 respectively with which it is associated. Thus, as the signal frequency increases above 500 cycles per second, relay 16 is operated to remove low-pass filter 22 from the circuit. This action increases the cut-off frequency of the system to the 1,500 cycles per second value afforded by low-pass filter 20. Thereafter, removal of low-pass filter 20 from the circuit by operation of the associated relay 14 and the operation of relay 12 to remove low-pass filter 18 from the circuit provides a convenient means for increasing the cut-off frequency of the transmission system to the 13,500 cycles per second value determined by low-pass filter 10. As the frequency of the signal decreases, however, this extended pass band is no longer needed and in fact is detrimental in that it permits the transmission of noise frequencies. Accordingly, the appropriate ones of relays 18, 20 and 22 are allowed to drop out re-inserting the associated filters in circuit as the frequency falls to lower values.

Selective control of means for removing the several filters from the signal circuit may be accomplished in a variety of ways and in the system of Fig. 1 the output of the filter elements is employed as a source of control information. Thus the output of amplifier 24 is applied to a conventional frequency discriminator circuit 28 which is arranged to provide an output current which increases with applied frequency. The output of discriminator 28 is rectified by rectifier 30 and acted upon by a low cut-off low-pass filter 32 to produce a direct current varying directly with the frequency of the signal at the output of amplifier 24. This current is applied to the windings of relays 16, 14 and 12 connected in series. These relays may for example be marginal relays as shown in Fig. 1 and are designed to operate at different levels of applied current. Alternatively polar relays biased to operate at different levels of applied voltage may be employed. In either case, relay 16 is adjusted to operate at a value of current from rectifier 30 which corresponds to a frequency at the output of amplifier 24 of approximately 500 cycles per second. Likewise, relays 14 and 12 respectively are arranged to operate when the frequency at the output of amplifier 24 approaches 1,500 cycles per second and 4,500 cycles per second. Thus, it will be understood that as the frequency of the signal to be transmitted increases, the appropriate ones of the control relays are operated to by-pass the corresponding low-pass filter for the purpose of increasing the cut-off frequency of the system transmission characteristic. Obviously as the frequency of the applied signal decreases, the appropriate relays drop out to reinsert the appropriate associated low-pass filters in the circuit between the input and the utilization circuit of the system.

If the amplitude of the signal to be transmitted is variable, a limiter should be inserted at the input to the discriminator, in order that the relay control current from the rectifier shall not vary with signal amplitude but only with signal frequency. Alternatively, amplifier 24 may be provided with automatic volume control.

In the arrangement of Fig. 1 as described above, the various frequency-restrictive elements are selectively connected in tandem between the input and output circuits and are arranged to introduce a low-pass characteristic. Obviously the several filters may be provided with high-pass characteristics if desired and the control circuit modified to adjust the cut-off point with decreasing frequencies of the applied signal. In general this may be accomplished by opposing the output of discriminator-rectifier 28, 30 by appropriate bias voltages. It is assumed that travel times of relays 12, 14 and 16 are negligible and that the cut-off frequency of filter 32 is low so that the relay winding current is not appreciably affected by contact travel. Otherwise make-before-break contacts should be employed.

In Fig. 2, there is disclosed a transmission system having a high-pass characteristic the cut-off frequency of which is varied according to the invention. In this particular system, however, the various frequency-restrictive elements are located in separate paths which may be connected in parallel with the main path from the input to the utilization circuit as required to obtain the desired transmission characteristic. It will be understood that this arrangement of filter elements may also be used for low-pass filters and that the arrangement of Fig. 1 may also be used for high-pass systems.

In the high-pass system of Fig. 2, the same frequency range as assumed in connection with Fig. 1 will be employed for purposes of illustration. Accordingly, the input signal is applied to high-pass filter 34 having a cut-off frequency of 13,500 cycles per second and from this filter is applied to the utilization circuit 36 through an amplifier 38 preferably provided with automatic volume control. In addition to this signal path from the input to utilization circuit there are provided a plurality of parallel paths, each of which includes a filter and a switch or gate circuit. The first of these paths includes a filter 40 having a cut-off frequency of 4,500 cycles per second connected through a gate circuit shown generally at 42 to the input of amplifier 38. Additional parallel paths include filter 44 having a cut-off frequency of 1,500 cycles per second and gate 46 and filter 48 having cut-off frequency of 500 cycles per second and gate 50.

Each of gate circuits 42, 46 and 50, which will be considered in detail below, comprises elements which under certain conditions complete a signal transmission path from the filter element with which it is associated to the input of amplifier 38 and under other predetermined conditions opens that path. Thus, when all of the parallel paths are completed, the cut-off frequency of the system is the 500 cycle per second value determined by high-pass filter 48. The cut-off frequency is progressively increased by interrupting the parallel paths including filters 48, 44 and 40 in turn.

As in the case of the arrangement of Fig. 1, the control of the switching or gate elements is effected in response to variations in the frequency of the signal to be transmitted. It will be noted, however, that as an alternative arrangement, the control quantity is obtained in the circuit of Fig. 2 from the input to the system rather than from the output as in Fig. 1. These two arrangements may be used interchangeably so long as in the control arrangement of Fig. 1, it is insured that the signal which is first applied includes a frequency which can be transmitted through the system when all of the gate or switching circuits are in the unoperated condition. This is not necessary when the control quantity is obtained from the input as in the arrangement of Fig. 2.

In the circuit of Fig. 2, the signal to be transmitted is applied to a discriminator-rectifier 52, the output of which appears across a resistor 54. The internal connections of the discriminator-rectifier are so arranged that the upper terminal of resistor 54 is made progressively more positive with respect to its lower terminal as the frequency of the applied signal increases. The voltage developed across resistor 54 is employed to control the operation of the three gate circuits 42, 46 and 50. These circuits are identical except for the bias voltages applied thereto and the following detailed description of gate circuit 42 is applicable to all.

Gate circuit 42 comprises four rectifiers 56 connected in pairs in leads 58 and 60 and so poled as to conduct current from left to right in the drawing. The output of high-pass filter 40 is applied between leads 58 and 60 through a transformer 62, the secondary winding of which is center tapped. These leads are also connected to the input of amplifier 38 through a second transformer 64, the primary winding of which is center tapped. A resistor 66 is bridged between leads 58 and 60 between the pairs of rectifiers included in the respective leads and tends to increase attenuation due to the gate 42 when it is in the non-conducting condition. If now the center tap on the secondary winding of transformer 62 is made positive with respect to the center tap of the primary winding of transformer 64, the rectifier 56 will represent a low impedance path between high-pass filter 40 and amplifier 38. Conversely, if the center tap of transformer 62 is made negative with respect to that of transformer 64, the four rectifiers 56 will represent high impedances and will effectively act to interrupt transmission from filter 40 to amplifier 38.

The voltage developed across resistor 54 in response to variations in the frequency of the applied signal is applied between the center taps of transformers 62 and 64 in series with a biasing voltage obtained from a potentiometer 68 supplied by a battery 70. This bias voltage opposes the voltage developed across resistor 54 and tends normally to render the gate 42 conductive to complete the path from the associated filter output to amplifier 38. However, as the voltage developed across resistor 54 increases indicating an increase in the frequency of the applied signal, the bias voltage applied to the gate is overcome and the gate is made nonconductive effectively removing the parallel path including high pass filter 40 from the signal transmission circuit.

Examination of Fig. 2 will indicate that progressively smaller fixed bias voltages are applied to gates 42, 46 and 50. Let it be assumed that the input signal initially is of a frequency greater than 13,500 cycles per second. This signal will be transmitted through filter 34 to the utilization circuit 36 and will also be applied to discriminator-rectifier 52. The large voltage developed across resistor 54 in response to an input signal of such a high frequency is adjusted to exceed the fixed bias voltages applied to any of gates 42, 46 and 50. These gates are, therefore, rendered non-conductive and none of the additional paths between the input and the utilization circuit are completed.

As the input signal frequency decreases below 13,500 cycles per second, however, the signal can no longer traverse filter 34. At the same time the voltage across resistor 54 is reduced and is no longer sufficient to maintain gate 42 in the non-conductive condition. Gate 42, therefore, becomes conductive and high-pass filter 40 having a cut-off frequency of 4,500 cycles per second is connected in shunt with filter 34 and the lower frequency signal may thus reach the utilization circuit. At this time the voltage across resistor 54 is still sufficient to maintain gates 46 and 50 in the non-conducting condition so that the bandwidth of the system is not increased beyond that required for the transmission of the particular applied signal.

It will be understood, however, that as the frequency of the applied signal becomes increasingly lower and the voltage across resistor 54 is correspondingly decreased, first high-pass filter 44 and finally high-pass filter 48 are effectively connected in parallel with high-pass filter 34 to modify the bandwidth of the system and to permit transmission of the lower frequency signals to the utilization circuit.

It will be recalled that each of the amplifiers 24 (Fig. 1) and 38 (Fig. 2) was stated preferably to be provided with automatic volume control. Such an amplifier is desirable for use in the systems of the invention to eliminate the possibility of amplitude variations in the signal due to unequal transmission through the several filters selectively connected in circuit between the input and the utilization circuit. If such changes in transmission can be tolerated, the automatic volume control circuit is, of course, unnecessary.

If the signals applied to the input of the arrangement shown in Fig. 2 tend to vary in level, a limiter may be connected in the input of discriminator 52 to insure that only frequency variations can cause variations in the voltage across resistor 54. As in the case of Fig. 1 a low-pass filter 57 following the discriminator-rectifier 52 is provided to remove alternating components from the voltage applied to resistor 54.

What is claimed is:

1. A transmission system comprising a source of energy the frequency of which may vary within a range of values, a utilization circuit responsive to said energy and means for adjusting the bandwidth of energy applied to said utilization circuit to a value including the frequency of the energy from said source comprising a plurality of frequency-restrictive elements having related cut-off frequencies progressively further removed from a predetermined frequency from said source, switching circuits for connecting said elements selectively in circuit between said source and said utilization circuit, means responsive to said energy to produce a control quantity varying only as a function of the frequency of said energy and means utilizing said control quantity for adjusting said switching circuits.

2. In a transmission system a source of energy the frequency of which may vary within a range of values, a receiver for said energy and means for adjusting the bandwidth of energy applied to said receiver to a value including the frequency of the energy from said source comprising a plurality of filters having different and related cut-off frequencies, switches for connecting said filters selectively in tandem in circuit between said source and said receiver, means responsive to said energy to produce a control quantity varying only as a function of the frequency of said energy and means utilizing said control quantity for adjusting said switches.

3. In a transmission system, a source of waves of varying frequency, a receiver responsive to said energy and means for limiting the acceptance band of said receiver to include a minimum range of frequencies in addition to the frequency of the wave being received comprising a plurality of frequency-restrictive elements passing frequencies below progressively lower cut-off limits connected in tandem between said source and said receiver, means including switching circuits for each of said elements for selectively by-passing that element and a frequency-sensitive circuit responsive to the frequency of signals from the last of said frequency restrictive elements for producing control voltages for said switching circuits.

4. In a transmission system, a source of energy the frequency of which may vary within a range of value, a utilization circuit responsive to said energy and means for adjusting the bandwidth of energy applied to said utilization circuit to a value including the frequency of the energy from said source comprising a plurality of frequency-restrictive elements having related cut-off frequencies progressively further removed from a predetermined frequency from said source, a discriminator-detector responsive to the frequency of said energy for producing a control voltage varying only as a function of the frequency thereof and switching circuits selectively responsive to variations in said control voltage for inserting the corresponding frequency-restrictive element in circuit between said source and said utilization circuit.

5. In a transmission system, a source of oscillations the frequency may vary within a range of values, a utilization circuit responsive to said oscillations and means for adjusting the bandwidth of energy applied to said utilization circuit to include the frequency of the oscillations from said source at any particular time while excluding other frequencies in the range of frequency variation of said oscillations comprising a series of low-pass filter elements having progressively higher cut-off frequencies, means including switching circuits for connecting said elements selectively in circuit between said source and said utilization circuit, means responsive to said oscillations to produce a control quantity varying only as a function of the frequency of said oscillations and means utilizing said control quantity for controlling said switching circuits in accordance with the changes in the frequency of said oscillations.

6. In a transmission system, a source of oscillations of varying frequency, a utilization circuit responsive to said oscillations and means for adjusting the acceptance band of said utilization circuit to include the frequency of the oscillations from said source while excluding other frequencies in the range of frequency variation of said oscillations comprising a plurality of filter elements having related cut-offs frequencies, a plurality of marginal relays each requiring a different operating current and each having a pair of normally closed contacts and a pair of normally open contacts, means normally interconnecting said source and said utilization circuit and said filter elements in tandem through the normally closed contacts of said marginal relays, the contacts of each of said marginal relays controlling the connection in circuit of a different filter element a circuit arranged to by-pass the associated filter element through the normally open contacts of each relay when operated and a frequency-sensitive element responsive to said oscillations to produce a current varying with the frequency of said oscillations for application to all of said marginal relays.

7. The transmission system of claim 1 in which the switching circuits are arranged for connecting the plurality of frequency restrictive elements selectively in tandem in circuit between the source and the utilization circuit, and in which the means responsive to said energy to produce the control quantity is connected to the input of the circuit including the tandem connected frequency restrictive elements.

8. The transmission system of claim 1 wherein said frequency restrictive elements comprise a plurality of paths connected between said source and said utilization circuit, each path having a different frequency characteristic and including means normally interrupting the path; and wherein the control quantity is applied to the switching means in the several paths for operating the switches at different levels of the control quantity to complete a path capable of transmitting said energy at all times and excluding other frenquencies in the range of variation of the frequency of said energy.

9. The transmission system of claim 1 wherein the frequency restrictive elements comprise a series of high pass filters having progressively lower cutoff frequencies within said range of values.

10. The transmission system of claim 1 in which an amplifier is connected at the input of said utilization circuit said amplifier having automatic volume control means to eliminate variations in the level of said energy as applied to said utilization circuit caused by insertion of said frequency restrictive elements in circuit.

References Cited in the file of this patent

UNITED STATES PATENTS

| | | |
|---|---|---|
| 1,961,329 | Beers | June 5, 1934 |
| 1,965,720 | Nicolson | July 10, 1934 |
| 2,413,263 | Suter | Dec. 24, 1946 |
| 2,575,910 | Mathes | Nov. 20, 1951 |
| 2,606,970 | Scott | Aug. 12, 1952 |
| 2,606,971 | Scott | Aug. 12, 1952 |
| 2,606,972 | Scott | Aug. 12, 1952 |